United States Patent [19]
Ferguson

[11] 4,068,190
[45] Jan. 10, 1978

[54] LASER SYSTEM HAVING FREQUENCY DOUBLING

[75] Inventor: Gerald D. Ferguson, Yardley, Pa.

[73] Assignee: The United States of America as represented by the Secretary of the Navy, Washington, D.C.

[21] Appl. No.: 656,775

[22] Filed: Feb. 9, 1976

[51] Int. Cl.² ............................................... H015 3/10
[52] U.S. Cl. ................................. 331/94.5 C; 350/157
[58] Field of Search ..................... 331/94.5 C, 94.5 E, 331/94.5 S, 94.5 T, 94.5 N; 307/88.3; 330/4.3; 350/160 R, 157

[56] References Cited
U.S. PATENT DOCUMENTS

| | | | |
|---|---|---|---|
| 3,529,885 | 9/1970 | Amman | 350/160 R |
| 3,564,454 | 2/1971 | Hook et al. | 331/94.5 C |
| 3,670,258 | 6/1972 | Magnante | 331/94.5 N |
| 3,684,350 | 8/1972 | Wentz | 350/157 |
| 3,740,663 | 6/1973 | Andringa | 331/94.5 Q |
| 3,798,571 | 3/1974 | Segre | 331/94.5 T |
| 3,928,818 | 12/1975 | White | 331/94.5 T |

FOREIGN PATENT DOCUMENTS

| | | | |
|---|---|---|---|
| 2,220,173 | 11/1973 | Germany | 331/94.5 T |

OTHER PUBLICATIONS

Oettinger, "Three-mirror double-pass laser", *Journal of Applied Physics*, vol. 46, No. 12, Dec. 1975, pp. 5288-5289.

*Primary Examiner*—Stanley D. Miller, Jr.
*Assistant Examiner*—James W. Davie
*Attorney, Agent, or Firm*—R. S. Sciascia; Henry Hansen; William J. Iseman

[57] ABSTRACT

A laser system for ocean radar applications having a resonant chamber for producing a pair of homogenized, singularly polarized output beams having identical pulse widths and energies. A quarter wave plate is inserted within the optical path of the resonant chamber and rotates the birefringence effects of a laser crystal positioned within the chamber to generate a pair of homogenized, orthogonally polarized beams. A selected one of the orthogonally polarized beams is transmitted through a half wave plate and joins with the remaining beam for passage through a telescope assembly to minimize the cross-sectional area of the beams. A doubler crystal receives the telescoped beams and doubles the frequency thereof to form the pair of homogenized output beams having light energy in the green spectrum.

4 Claims, 1 Drawing Figure

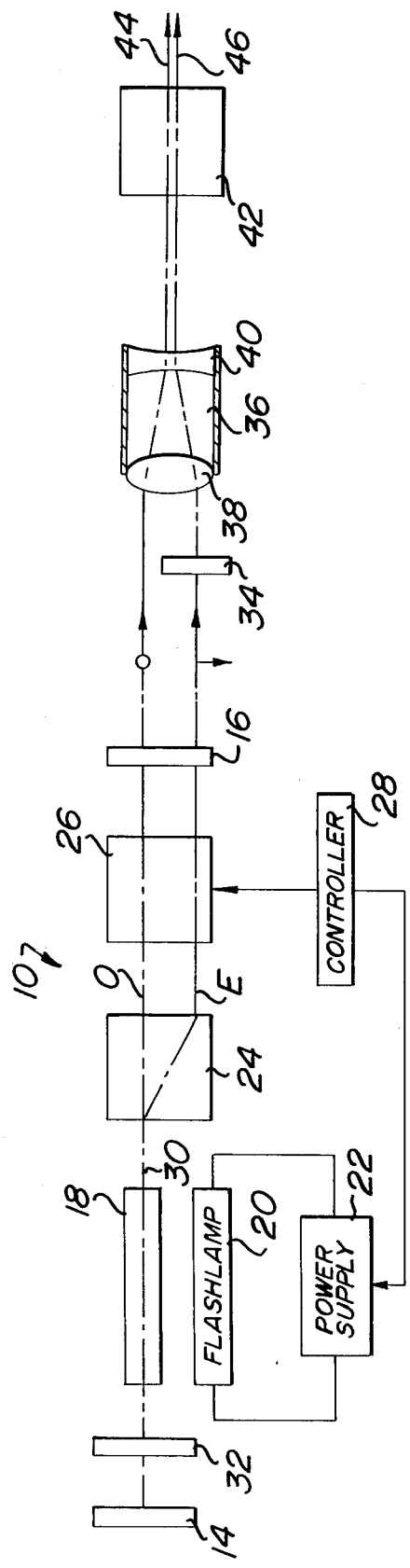

LASER SYSTEM HAVING FREQUENCY DOUBLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to laser systems and particularly to a laser system having a frequency doubler device for producing a pair of singularly polarized output beams having identical pulse widths and energies.

In particular radar applications involving laser apparatus, it is desirable that a pair of output light beams be generated from a laser system wherein both of the beams exhibit homogeneous characteristics. That is, the beams are homogeneous with respect to identical energies and pulse widths. In a given application, the generation of a pair of orthogonally polarized homogenized beams within the infrared region may be efficiently utilized in air-to-ground radar applications as target designators and thereby afford the coverage of a larger ground area with a reduction in the time spent over the target. Other radar applications requiring operation within an ocean environment for detection and observation of underwater targets requires the generation of light energy within the green spectrum. Assuming the initial generation of laser light energy within the infrared spectrum such as by the utilization of a neodymium doped yttrium aluminum garnet (YAG) laser device, the output light energy will have to be doubled to produce a green output. Doubler crystals of the type generally well known in the art are sensitive to phase and energy mismatches of light beams selected for doubling. Laser systems have been developed for the generation of laser light energy in a pair of orthogonally polarized rays by Q-switching techniques applied in conjunction with a birefringent crystal. One example of such a laser system is taught in U.S. Pat. No. 3,740,663 to Andringa. Such systems, however, do not anticipate the generation of homogenized light beams and, more particularly, do not exploit the use of such homogenized light beams in conjunction with the critical demands of a frequency doubler crystal for radar applications.

SUMMARY OF THE INVENTION

Accordingly, it is an object of the present invention to provide a laser system for generating a pair of output light beams which have identical pulse widths and energies. Another object of the invention is to double the frequencies of laser light beams to produce a pair of homogenized output beams in a single polarization and having light energy in the green spectrum. A further object of the present invention is to provide homogenized laser beam outputs that can be efficiently used in infrared and ocean environment radar applications. Yet another object of the present invention is to provide frequency doubling of light energy beams with minimal phase distortion and optimal transmission of light energy.

Briefly, these and other objects are accomplished by a laser system having a resonant chamber for producing a pair of homogenized, singularly polarized output beams having identical pulse widths and energies. A quarter wave plate is inserted within the optical path of the resonant chamber which is bounded by a pair of end reflectors. The plate rotates by 90° the unpolarized light generated within the chamber to counteract the birefringent effects of the laser crystal positioned therein. A birefringent crystal divides the unpolarized light into a pair of orthogonally polarized ordinary (o) and extraordinary (e) light rays which are passed through a Pockels cell for Q-switching. The Q-switched homogeneous rays provide light energy outputs which are identical and within the infrared region. Further processing of the rays is accomplished by passage of the extraordinary ray through a half wave plate for further rotation and joining with the ordinary ray in a telescope assembly which diminishes the cross-sectional area of each of the rays. A frequency doubler crystal receives the emergent rays from the telescope and provides a pair of singularly polarized parallel output beams having identical energies and pulse widths within the green spectrum.

For a better understanding of these and other aspects of the invention, reference may be made the following detailed description taken in conjunction with the accompanying drawing.

BRIEF DESCRIPTION OF THE DRAWING

The drawing is a block diagram of a frequency doubling laser system according to the invention.

DESCRIPTION OF THE PREFERRED EMBODIMENT

Referring now to the drawing, there is shown a block diagram of a laser system 10 according to the invention. An optically resonant chamber for generating laser light is bounded by a pair of end reflecting mirrors 14 and 16. Mirror 14 is fully reflective and mirror 16 is partially reflective. A laser crystal 18, formed in the shape of a rod, is placed adjacent a flashlamp 20 in any generally well known manner so as to receive the light impulses generated thereby. A flashlamp power supply 22 is connected to the lamp 20 for energization thereof. Optically aligned with one end of the laser crystal 18 is a birefringent crystal 24 which provides a pair of light rays to a Pockels cell 26. A controller 28 provides electrical signal outputs to both the Pockels cell 26 and the power supply 22. The laser crystal 18 produces a single unpolarized light beam 30 which is generated and exists within the resonant chamber prior to its transmission to the birefringent crystal 24 which splits the single beam into the ordinary ray O and the extraordinary ray E. Positioned between one end of the laser crystal 18 and the mirror 14 is a quarter wave plate 32 whose operation and effect will be described with greater detail hereinafter. A half wave plate 34 is positioned adjacent the mirror 16 and orthogonal to the axis of the extraordinary ray E. A telescope 36 comprising a converging lens 38 at one end and a diverging lens 40 at the other end is optically connected to receive the ordinary ray passed through the mirror 16 and the extraordinary ray processed through the plate 34. A doubler crystal 42 is optically connected to receive the emergent pair of rays from the telescope 36 and provides a pair of singularly polarized homogeneous output beams 44, 46.

Referring again to the drawing, the operation of the invention will now be described. Assuming, by way of example, that the laser crystal 18 comprises a neodymium-doped YAG material, the flashlamp 20 is energized by outputs from the power supply 22 to supply light energy to the laser crystal 18 in well known conventional manner. Stimulated emissions of light are radiated from the crystal to produce the unpolarized light 30 shown as being generated along the main optical axis of the chamber. In the absence of an electrical signal from controller 28 to Pockels cell 26 the unpolarized light beam 30 radiated by laser crystal 18 follows a path substantially coaxial with the main optical axis. Such unpolarized light enters birefringent crystal 24 where it is separated into the ordinary ray O and the spatially displaced extraordinary ray E, each such ray being essentially parallel to the main optical axis and to the other upon leaving such birefringent crystal. As is generally well known, the electric field of one such ray is of mutually orthogonal linear polarization relative to the other. The ordinary ray and extraordinary ray simultaneously pass through the Pockels cell 26 and are partially reflected by the end mirror 16. After being reflected by the mirror 16, the rays repass through birefringent crystal 24 and combine in a well known manner to form randomly polarized light. Such randomly polarized light follows the same path, but in opposite directions, from that path followed by the unpolarized light radiated by laser crystal 18, that is, coaxial with the main optic axis. When an electrical signal is supplied to Pockels cell 26, the unpolarized light radiated by the crystal 18 enters birefringent crystal 24 where it is separated into the ordinary ray and the spatially displaced orthogonal linearly polarized extraordinary ray, each such ray being essentially parallel to the main optic axis and to the other upon leaving such birefringent crystal, as previously described. The ordinary ray and the extraordinary ray, however, have their electric fields altered by the electrically actuated Pockels cell when passing through such Pockels cell from the left to form circularly polarized light beams and, after each such polarized ray is reflected by mirror 16, are altered a second amount by the Pockels cell on repassage therethrough from the right. Each such ray leaves the Pockels cell and is passed to the birefringent crystal 24 which rejects the rays due to the rotation by 90° of the associated E vectors. This rotation is caused by the passage and repassage of the rays through the activated Pockels cell.

From the discussion above, the operation of a Q-switched laser system can now be readily understood. In particular, the signal from controller 28 is supplied to the power supply 22 whereby light energy is supplied to laser crystal 18 by the flashlamp 20 in a conventional manner. During this light pumping cycle, an electrical signal is also supplied to the Pockels cell 26 by controller 28 and an inverted population of ions within laser crystal 18 takes place between a first and second energy level therein. It is here noted that the laser system remains in a low Q condition during this light pumping cycle since, as described above, light radiated by laser crystal 18 does not reflect back and forth through such crystal.

When the desired inverted population level is attained, the electrical signal supplied by controller 28 to Pockels cell 26 is removed, thereby allowing unpolarized light radiated by the laser crystal to pass back and forth through laser crystal 18 and between the end mirrors 14 and 16 in a well known manner. In such a scheme, the light passing back and forth between the mirrors becomes distorted in having passed through the laser crystal and includes undesirable components with orthogonal polarization. Such distortions are a result of the birefringent effects produced from temperature increases within the laser crystal. The performance of the crystal 18 under such stress conditions produces the birefringent effects which tend to distort one electric field vector of the light beam entering the laser crystal more so than the other field vector. Consequently, the distortion of such orthogonal polarization components reduces the efficiency of the resonant chamber and therefore the amplitude of any output beam conventionally known as a "giant pulse". In order to counteract such birefringent distortion effects, the quarter wave plate 32 is positioned within the resonant chamber between the end mirror 14 and the laser crystal 18 and orthogonal to the main optical axis. The operative characteristics of a quarter wave plate are generally well known in the art and suffice it to say that the plate 32 receives the incoming distorted polarized light beam from the crystal 18 and transforms all of the various polarization components thereof into two orthogonal components which are phase shifted 90°. The end mirror 14 fully reflects the emerging components from the quarter wave plate 32 and causes the components to repass through the plate with an additional phase displacement of 90° or a total phase displacement of 180°. Moreover, the singularly polarized field vector initially passed through the plate 32 will be shifted 90° after repassage through the plate. Having passed through the quarter wave plate 32 twice, the newly formed orthogonal components have been displaced 180° out of phase with one another with the effect that the first axial component produced by the plate 32 is effectively interchanged with that of the second axial component produced by the plate. The interchanged axial components are repassed through the laser crystal 18 which applies the same birefringent distortions to the vector components formerly passing in the opposite direction as described previously. On repassing however, the birefringent effects act on the reversed field components which, when emerging from the crystal 18, are homogenized with respect to pulse width and energy content. That is, incoming beams having field vectors along arbitrary X and Y axes will be distorted in passing through the birefringent laser crystal. This distortion will effect one axis component more so than the other. For example, the crystal 18 may cause the X axis component to be reduced in magnitude. On emerging from the laser crystal and passing through the quarter wave plate and being reflected from the end mirror 14, the X axis component of the beam is interchanged with the Y axis component with the resultant effect that upon repassage through the birefringent crystal, the new X component (formerly the Y component) is similarly reduced in magnitude. The result is that each of the emergent field components coming from the crystal 18 have been acted on by identical distortion effects and, consequently, the orthogonal polarizations have identical energies and pulse widths. Having achieved homogeneity of the output beam of the crystal 18, the beam is separated into ordinary and extraordinary rays by the crystal 24 as described hereinbefore and pass through the remainder of the chamber structure to be coupled out of the resonant chamber by the partially reflecting end mirror 16 as a pair of parallel, orthogonally polarized light beams having identical energies and pulse widths. The polarization of each of the beams are noted in the drawing by a circle and a set of directional arrows drawn about the path of the ordinary and extraordinary rays. On the ordinary ray axis, the arrow notes the direction of the light beam and the associated circle defines the associated electrical (E) field vector as going orthogonal to the axis of the ordinary ray and into the plane of the drawing. The extraordinary ray, which is orthogonally polarized relative to the ordinary ray, is shown having a direction arrow placed parallel to that of the ordinary ray axis and a second directional arrow pointing downward to designate an E field vector having a 90° rotation relative to the E field vector noted on the axis of the ordinary ray.

Pausing at this point in the description of operation, the orthogonally polarized homogeneous output beams passing through the end mirror 16 can be advantageously used in radar applications. For example and assuming, as earlier noted, that the laser crystal 18 is comprised of neodymium YAG material, the homogenized output beams will each have frequencies of 1.06 microns within the infrared region. One such radar application of the homogeneous beams would involve an air-to-ground radar apparatus which, because of the duality of the beams, would be able to sweep an area approximately twice as large and in a reduced amount of time than as compared to a more conventional laser system having a single beam laser output.

A further application of the homogeneous output beams can advantageously be made with respect to radar applications for an ocean environment. Assuming once more a neodymium YAG laser crystal, the frequency of each of the output beams will have to be doubled in order to produce visible light within the green spectrum. As is well known in the art, however, conventionally available doubling crystals, whether of the temperature tuned or angle tuned type, prove extremely sensitive to energy mismatches within incoming beams selected for doubling. Slight mismatches in energy content produce deteriorative effects within the doubler crystal with consequential reduction in output energies and phase mismatching. More serious energy mismatches often produce fracture in the doubler crystal causing ultimate failure. To this end therefore, frequency doubling apparatus is combined in the present invention with the earlier noted homogeneous output beam apparatus to produce a pair of singularly polarized output beams which have been most efficiently doubled in frequency to produce light energies in the green light spectrum. Accordingly, the operation of the remaining apparatus of the present invention will now be described. The half wave plate 34 is placed orthogonal to the path of the extraordinary ray exiting from the end mirror 16 to cause a 90° rotation of the E vector so as to be placed in identical alignment with the E vector of the ordinary ray exiting from the mirror 16. At this point of operation, therefore, both of the beams are homogenized with respect to identical energies and pulse widths and also have single polarizations. The telescope 36 is optically connected to receive the parallel beam outputs from the mirror 16 and the plate 34 at the converging lens 38 and to pass the converged beams through the diverging lens 40 so as to minimize, in a predetermined manner, the cross-sectional area of each of the beams. As is well known in the art, the peak power per unit area of a light beam is inversely proportional to the cross-sectional area of that beam. As the cross-sectional area of the beam is minimized, however, the power of the beam increases rapidly with consequential risk of fracture. Practical restraints, therefore, are imposed on the minimization of the cross-sectional area due to the limited amount of peak power that various system components may safely withstand. The double crystal 42 which is conventional in structure and may be either of the temperature tuned or angle tuned type parallelly receives the homogeneous light beams and produces a pair of homogeneous, singularly polarized output beams 44, 46 having light energies within the green spectrum.

Thus it may be seen that there has been provided a novel laser system having frequency doubling for producing a homogeneous pair of output light beams having identical pulse widths and energies. Obviously, many modifications and variations of the invention are possible in light of the above teachings. It is therefore to be understood that within the scope of the appended claims the invention may be practiced otherwise than as specifically described.

What is claimed is:
1. A laser system, comprising, in combination:
first and second mirrors spatially positioned to form an optically resonant chamber, said first and second mirrors being partially and fully reflective, respectively;
solid-state laser means positioned in said chamber to radiate laser energy along a first optical axis extending through said mirrors;
polarizer means positioned along the first axis for directing the radiation of one polarity along the first axis to said first mirror and radiation of another polarity along a second optical axis extending through said first mirror and parallel to the first axis, for maintaining radiation of the one polarity returning along the first axis on the first axis and for directing the radiation of the other polarity out of said chamber, and for directing the radiation of the other polarity returning along the second axis into the first axis and for directing the radiation of the one polarity along the second axis out of said chamber;
a Pockels cell positioned along the first and second axes for changing the respective polarities of the returning radiation;
a quarter-wave plate positioned on the first axis for changing the polarities of the radiation returning from said second mirror;
a half-wave plate positioned on the second axis for changing the radiation passed through said first mirror from the other to the one polarity; and
frequency doubling crystal positioned on said first and second axes to receive the radiation of the one polarity from said first mirror and from said half-wave plate for doubling the frequency of the radiation.

2. A laser system according to claim 1 wherein said one and other polarities are mutually orthogonal.

3. A laser system according to claim 2 wherein said laser means is a neodymium-doped YAG crystal.

4. A laser system according to claim 3 further comprising: optical means positioned on the first and second axes between said half-wave plate and said doubling means for decreasing the cross-sectional area of the radiation to said doubling means.

* * * * *